US012281757B2

(12) United States Patent
Heo et al.

(10) Patent No.: US 12,281,757 B2
(45) Date of Patent: Apr. 22, 2025

(54) PRESSURE VESSEL

(71) Applicant: AETHER CT CO., LTD., Busan (KR)

(72) Inventors: Seok-Bong Heo, Jeonju-si (KR); Sang-Jin Jeon, Jeonju-si (KR); Jae-Sung Park, Jeonju-si (KR)

(73) Assignee: AETHER CT CO., LTD., Busan (KR)

( * ) Notice: Subject to any disclaimer, the term of this patent is extended or adjusted under 35 U.S.C. 154(b) by 63 days.

(21) Appl. No.: 18/356,030

(22) Filed: Jul. 20, 2023

(65) Prior Publication Data

US 2024/0159363 A1 May 16, 2024

(30) Foreign Application Priority Data

Nov. 11, 2022 (KR) ........................ 10-2022-0150840

(51) Int. Cl.
*F17C 13/04* (2006.01)

(52) U.S. Cl.
CPC ...... *F17C 13/04* (2013.01); *F17C 2203/0604* (2013.01); *F17C 2205/0323* (2013.01)

(58) Field of Classification Search
CPC .............. F17C 13/04; F17C 2203/0604; F17C 2205/0323; F17C 2201/0109; F17C 2201/056; F17C 2203/0619; F17C 2203/0663; F17C 2203/0675; F17C 2205/0305; F17C 2209/228; F17C 2209/234; F17C 2221/011; F17C 2221/012; F17C 2221/014; F17C 2223/0123; F17C 2223/036; F17C 2260/036; F17C 2270/0178; F17C 2270/0184; F17C 1/16; F17C 13/002; F17C 1/005; F17C 13/06; F17C 2270/0168
See application file for complete search history.

(56) References Cited

U.S. PATENT DOCUMENTS

| | | | | |
|---|---|---|---|---|
| 10,274,132 B2 | 4/2019 | Chung et al. | | |
| 11,085,584 B2 | 8/2021 | Hwang et al. | | |
| 2007/0164561 A1 | 7/2007 | Kwon et al. | | |
| 2008/0251520 A1* | 10/2008 | Ota | .......................... | F17C 1/16 220/586 |

(Continued)

FOREIGN PATENT DOCUMENTS

| | | | |
|---|---|---|---|
| FR | 3102530 A1 | 4/2021 | |
| JP | 2004211783 A | 7/2004 | |

(Continued)

*Primary Examiner* — Andrew D Perreault
(74) *Attorney, Agent, or Firm* — CANTOR COLBURN LLP

(57) ABSTRACT

Provided is a pressure vessel intended for storing up a fluid having high pressure, and more specifically, to a pressure vessel capable of enabling a sealing pad made of an elastic material to effectively prevent the fluid from flowing out from a bonding portion of a nozzle and a liner. The pressure vessel includes: a liner formed to be hollow so as to enable its inside to be filled with the fluid; a nozzle combined with one side of the liner, or each end portion of both sides so as to enable a coupling part having a cylindrical shape to be located in the inside of the liner; a sealing pad having a ring-like shape configured to enable the coupling part to pass through its center, and formed of an elastic material; and a sealing nut coupled to the coupling part from a lower portion of the sealing pad.

12 Claims, 6 Drawing Sheets

(56) References Cited

U.S. PATENT DOCUMENTS

| | | | | |
|---|---|---|---|---|
| 2014/0144866 | A1 | 5/2014 | Heo et al. | |
| 2014/0318691 | A1 | 10/2014 | Olson | |
| 2018/0202554 | A1 | 7/2018 | Hogan | |
| 2019/0152312 | A1* | 5/2019 | Park | B60K 15/03 |

FOREIGN PATENT DOCUMENTS

| | | | |
|---|---|---|---|
| JP | 2007528473 | A | 10/2007 |
| JP | 2014149086 | A | 8/2014 |
| JP | 2018527534 | A | 9/2018 |
| KR | 20140066871 | A | 6/2014 |
| KR | 101434046 | B1 | 8/2014 |
| KR | 101437231 | B1 | 9/2014 |
| KR | 101806643 | B1 | 12/2017 |
| KR | 20180050931 | A | 5/2018 |
| KR | 102024270 | B1 | 11/2019 |
| KR | 20220099153 | A | 7/2022 |
| KR | 20220099155 | A | 7/2022 |
| KR | 20230096211 | A | 6/2023 |
| WO | 2007013445 | A1 | 2/2007 |

* cited by examiner

PRESSURE VESSEL

BACKGROUND OF THE INVENTION

Field of the Invention

The present invention relates to a pressure vessel configured to store up a fluid having high pressure, and more specifically, to a pressure vessel capable of enabling a sealing pad made of an elastic material to effectively prevent the fluid from flowing out from a bonding portion of a nozzle and a liner.

Description of the Related Arts

A pressure vessel is used for preserving all kinds of fluids, like oxygen, natural gas, nitrogen, and so on, and the pressure vessel has recently been as a vessel intended for storing up hydrogen which is fuel of eco-friendly hydroelectric cars.

In the past, a nozzle and a liner were manufactured of a metallic material, and were manufactured in such a manner as to wind and stack a carbon fiber or a glass fiber on an outer portion of the nozzle and the liner. However, a conventional pressure vessel manufactured with the metallic liner was problematic in that weight was heavy in the light of the characteristic of metal, it was very poor at corrosion, and at the same time as this, the cost of production was also high.

In order to solve this problem, a plastic liner using synthetic resins was manufactured, and in the light of the characteristic of plastic, its weight could become light compared with that of the liner made of the metallic material, and corrosion resistance could be improved.

The conventional pressure vessel improved has the liner made of a plastic material. The liner has a cylindrical shape, the inside of which is hollow, and has a shoulder part having a dome-like shape, a section of which is formed in a curved surface, at both sides.

Also, the carbon fiber and the glass fiber are stacked on an outer circumferential surface of the liner, the nozzle configured to discharge gas is mounted to the liner. The nozzle has a flange part bonded to the liner.

Also, in order to strengthen strength of the shoulder part vulnerable to pressure, a strengthening part is furnished.

In particular, in order to improve fire-resistant performance of the pressure vessel, the shoulder part is coated with a fire-resistant material 50. When the pressure vessel is exposed to a fire, the fire-resistant material is coated on a surface of the shoulder part which is the most vulnerable to the pressure.

Usually, with respect to the fire-resistance material, epoxy resins are used as a binder. Since the epoxy resins have excellent weather resistance, they reduce the danger of explosion when the pressure vessel is exposed to a fire.

FIG. 1 represents a state of a nozzle 60 made of a metallic material being combined with a liner 10 made of a plastic material. The nozzle 60 is combined with the liner 10 in such a manner as to prepare the nozzle 60 made of the metallic material, and then to treat the liner 10 by injection molding in a state of the nozzle 60 being mounted to a mold intended for treating the liner 10 by injection.

However, bonding of the liner 10 made of the plastic material, and the nozzle 60 made of the metallic material become a problem due to characteristics of their materials. That is, when the pressure vessel is repeatedly exposed to a high temperature and a low temperature, the liner and the nozzle are separated from each other from a bonding portion, so it is problematic in that a fluid filled in the inside of the liner flows out from the bonding portion. This problem may lead to a large accident because the fluid filled in the inside explodes by flowing out.

SUMMARY OF THE INVENTION

The present invention has been devised for solving the aforesaid problems, and an object of the present invention is to provide a pressure vessel capable of effectively preventing a fluid from flowing out from a bonding portion of a nozzle and a liner in such a manner that a sealing nut puts pressure on a sealing pad made of an elastic material.

It may be preferable that a pressure vessel according to the present invention intended for solving the aforesaid technical problems comprises: a liner formed to be hollow so as to enable its inside to be filled with a fluid; a nozzle combined with one side of the liner, or each end portion of both sides so as to enable a coupling part having a cylindrical shape to be located in the inside of the liner; a sealing pad having a ring-like shape configured to enable the coupling part 153 to pass through its center, formed of an elastic material, and having an inclined sealing part inclined so as to enable a longitudinal section to face downward in a central direction of the nozzle; and a sealing nut coupled to the coupling part from a lower portion of the sealing pad.

Also, it may be preferable that the pressure vessel further comprises a sealing plate having a ring-like shape furnished between the sealing pad and the sealing nut, configured to enable the coupling part to pass through its center, and formed to be harder than the sealing pad, wherein the sealing plate has an inclined supporting part which is inclined to enable the longitudinal section to face downward in the central direction of the nozzle so as to come into close contact with the inclined sealing part. Also, it may be preferable that the sealing pad comprises: a first horizontal sealing part which extends inward from the inclined sealing part, and which is formed horizontally; and a second horizontal sealing part which horizontally extends outward from the inclined sealing part.

Also, it may be preferable that thickness of the inclined sealing part is formed to be thicker than each thickness of the first horizontal sealing part and the second horizontal sealing part.

Also, it may be preferable that the sealing plate comprises: a first horizontal supporting part which extends inward from the inclined supporting part, and which is formed horizontally so as to support the first horizontal sealing part; a second horizontal supporting part which extends outward from the inclined supporting part, and which is formed horizontally so as to support the second horizontal sealing part Also, it may be preferable that an inner diameter of the sealing pad is greater than that of the sealing plate.

Also, it may be preferable that an outer diameter of the sealing pad is smaller than that of the sealing plate.

Also, it may be preferable that the nozzle is configured in such a manner that a flange part whose diameter extends is formed in an upper portion of the coupling part, an extending part extending from a side wall of the liner is formed in a lower portion of the flange part, the first horizontal sealing part comes into close contact with the nozzle, and the second horizontal sealing part comes into close contact with a lower porting of the extending part.

Also, it may be preferable that a breaking sill intended for strengthening coherence with the nozzle is formed at a tail end of the extending part.

Also, it may be preferable that on an upper surface of the sealing nut is formed an inclined surface whose longitudinal section faces downward in the central direction of the nozzle.

Also, it may be preferable that the sealing nut has a through hole so that pressure of a fluid preserved in the inside of the liner is transmitted to the sealing pad or the sealing plate.

According to the present invention, since the sealing nut puts pressure on the sealing pad made of the elastic material, the fluid can effectively be prevented from flowing out from the bonding portion of the nozzle and the liner Also, since the sealing plate is furnished between the sealing pad and the sealing nut, pressure can uniformly be applied to the sealing pad.

In particular, since a longitudinal section of the sealing pad is formed to face downward accordingly as gradually going near into a central direction, a leak of the fluid can effectively be prevented from occurring from a connection portion of the nozzle and the liner.

Furthermore, since an inner diameter of the sealing pad is formed to be greater than that of the sealing plate, and an outer diameter is formed to be smaller than that of the sealing plate, a space capable of increasing in length is given in such a manner as to apply pressure to the sealing pad in a thickness direction according to coupling of the sealing nut, so sealing can effectively be carried out.

Also, since the through hole is formed in the sealing nut, the pressure of the fluid is applied to the sealing plate, so sealing can be carried out in such a manner as to make the sealing pad come into close contact with the bonding portion of the nozzle and the liner using strong pressure.

DETAILED DESCRIPTION OF THE INVENTION

Figure 1:
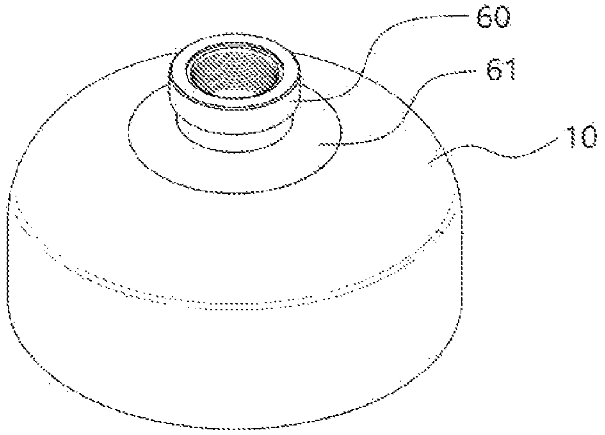
FIG. 1 PRIOR ART
FIG. 1 is a schematic view for describing the constitution of a conventional pressure vessel.
Figure 2:
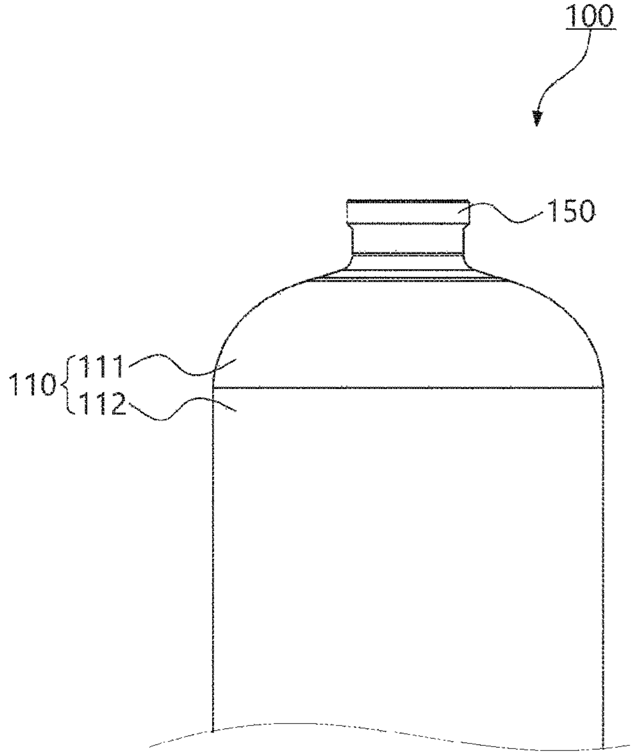
FIG. 2 represents the whole view of an exemplary embodiment according to the present invention.

Hereinafter, the constitutions and operation of the exemplary embodiments according to the present invention will be described in detail with reference to the accompanying drawings.

Referring to FIG. 2 to FIG. 5, a pressure vessel 100 according to the present invention comprises a liner 110 made of a synthetic resin or an elastic polymer material. The liner 110 has a cylindrical part 111 whose inside is hollow, and a shoulder part 112 having a dome-like shape, a section of which is formed in a curve surface at both sides of the cylindrical part 111. The liner 100 is formed to be hollow so that its inside is filled with a fluid.

A nozzle 150 configured to let the fluid come in and out is combined with the liner. Although the nozzle 150 is generally formed of metal, such as aluminum, brass, steel, or a nickel alloy, it may be formed of a nonmetallic material according to circumstances. The nozzle 150 comprises: an opening 151 having a cylindrical shape so that the fluid can come and go; a flange part 152, the diameter of which extends for bonding with the liner 110; and a coupling part 153 formed in a lower portion of the flange part 152, and having a screw thread on its outer circumferential surface.

The coupling part 153 is located in the inside of the liner 110, and the liner 110 is bonded to an upper portion and a lower portion of the flange part 152.

With the description in detail, when the liner 110 made of the synthetic resin material is treated by injection molding, the nozzle 150 may integrally be formed with the liner in such a manner as to insert the nozzle into a mold, and perform molding. The nozzle 150 may be furnished at one end or both ends of the liner 110.

In particular, a side wall of the liner 110 is treated by injection molding integrally with an upper portion of the flange part 152. In order to widen a contact surface, grooves configured to let resins for treating the liner 110 by molding flow in are formed in the flange part 152.

Also, the liner 110 has an extending part 113 configured to extend in a straight line form to be horizontal to a lower portion of the flange part 152 from the side wall, or to be close to horizontality, and a breaking sill 114 formed at a tail end of the extending part 113. Accordingly, in case that inner pressure becomes high because the inside of the pressure vessel is filled with the fluid having high pressure, the liner expands, so the liner may be separated from the nozzle, and the breaking sill 114 is intended to prevent the nozzle 150 and the liner 110 from being separated from each other.

Also, a screw thread is also formed on an inner circumferential surface of the opening 151, and is intended to mount piping (not drawn) configured to supply or discharge the fluid.

Also, it is preferable to form a protection layer (not drawn) in such a manner as to carry out stacking by winding a complex material, such as a carbon fiber, a glass fiber, or the like, round the outer circumferential surface of the liner 110.

Figure 3:
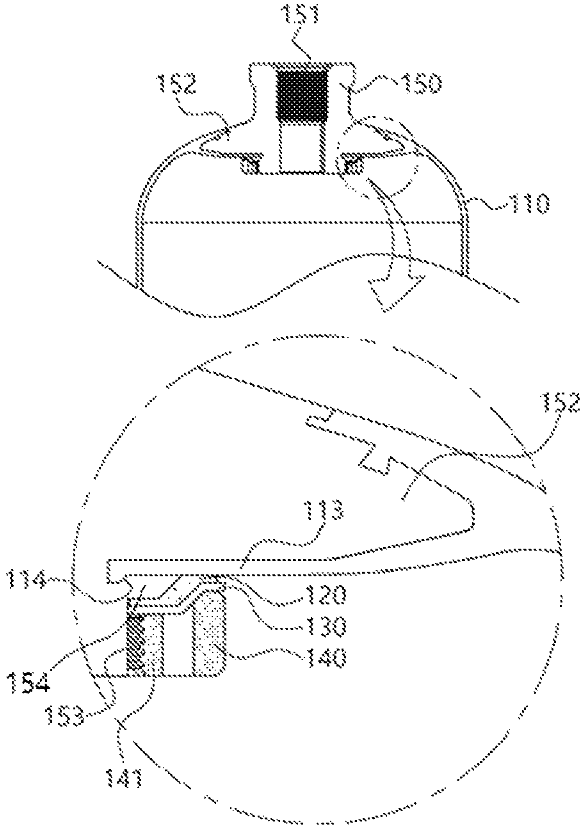
FIG. 3 to FIG. 5 are views intended for describing the main constitutions of the exemplary embodiment according to the present invention.
Figure 4:
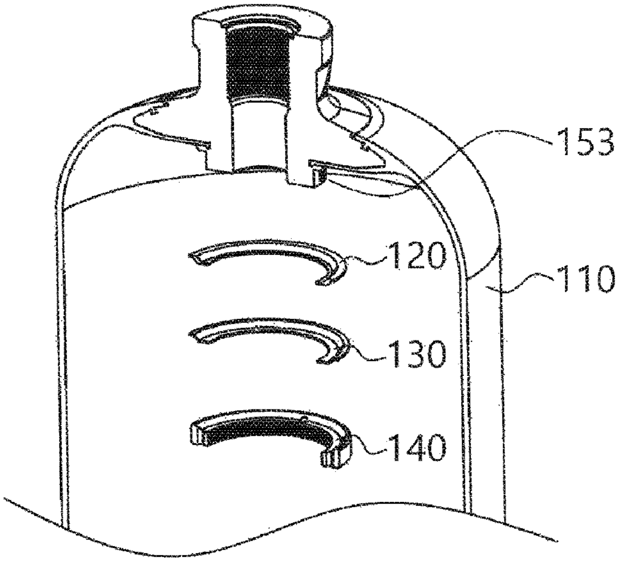
Figure 5:
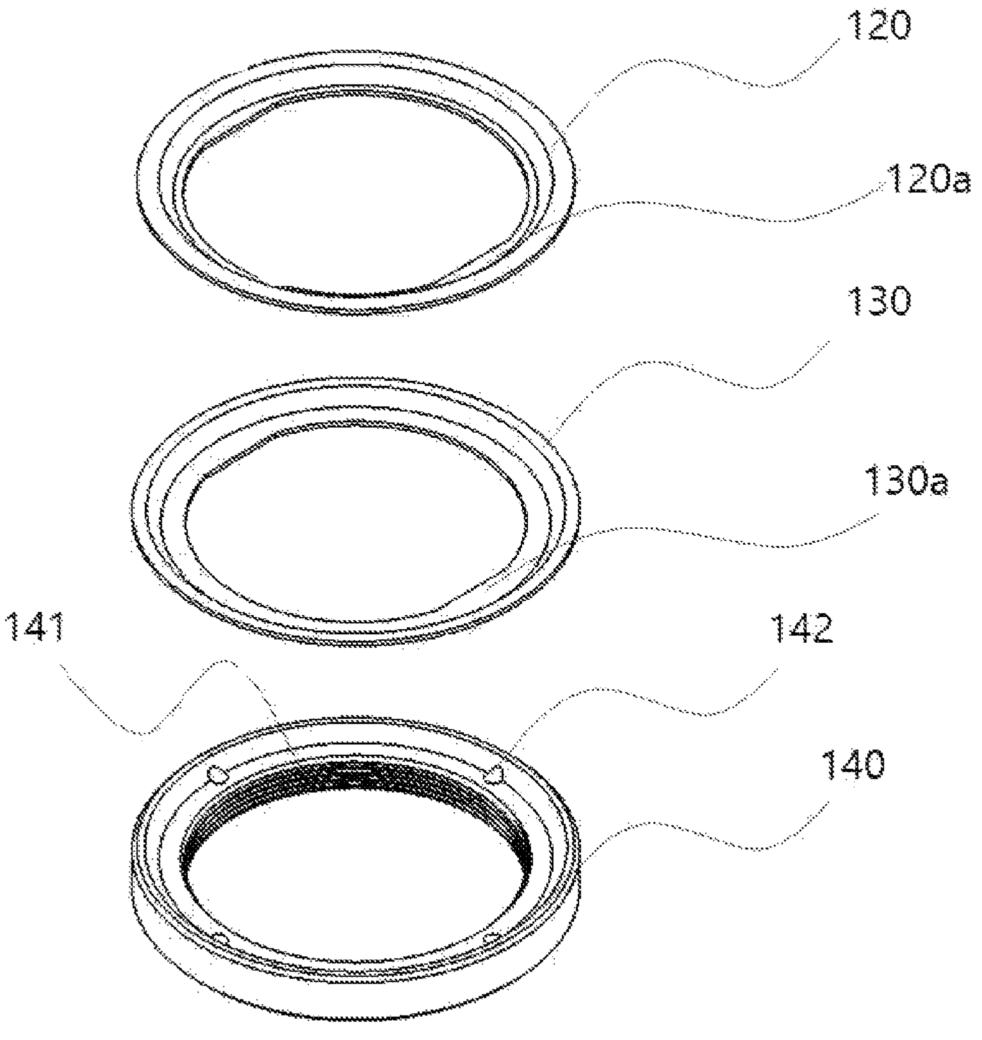
Figure 6:
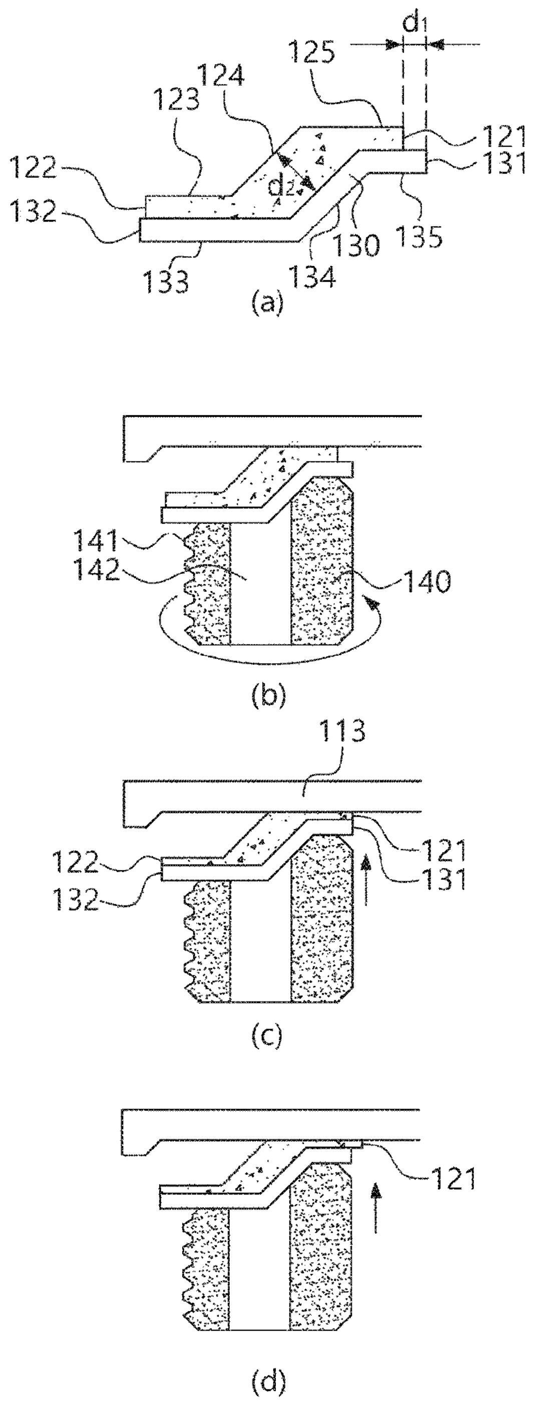
FIG. 6 is a view intended for describing operation of the exemplary embodiment according to the present invention.

Referring to FIG. 3 and FIG. 6, the pressure vessel 100 according to the present invention comprises a sealing pad 120, a sealing plate 130, and a sealing nut 140, which wrap round the coupling part 153, with respect to constitutions intended for preventing the fluid from flowing out from a bonding portion of the nozzle 150 and the liner 110, in particular, a bonding portion of the flange part 152 and the extending part 113.

With the description in detail, the sealing pad 120 is formed of an elastic material so as to enable sealing to be carried out by coming into close contact with the bonding portion of the nozzle 150 and the extending part 113, and is formed in a ring-like shape so as to make the coupling part 153 pass through the center. That is, the sealing pad 120 is located to wrap round the coupling pad 153.

Although the sealing pad 120 is entirely formed in the ring-like shape, the sealing pad is bent and formed to have an inclined surface so as to come into close contact with the connection portion of the nozzle 150 and the extending part 113. With the description in detail, it is preferable that the sealing pad 120 comprises: a first horizontal sealing part 123, one end of which comes into close contact with the coupling part 153 or an upper portion of the coupling part, and an upper surface of which comes into close contact with a protruding part 154; an inclined sealing part 124 configured to come into close contact with a bonding portion of the protruding part 154 and the extending part 113 by being formed to be inclined so as to face upward accordingly as gradually going near to the outside from the first horizontal sealing part 123; and a second horizontal sealing part 125 configured to come into close contact with a lower portion of the extending part 113 by horizontally extending from the inclined sealing part 124 to the outside.

Meanwhile, the protruding part 154 is formed to be prominent outward from the upper portion of the coupling part 153 so as to come into close contact with each of the first horizontal sealing part 123 and the inclined sealing part 124.

Also, it may be found that thickness (d2 shown in FIG. 6) of the inclined sealing part 124 is formed to be thicker than each thickness of the first horizontal sealing part 123 and the second horizontal sealing part 125. Like this, the reason why the inclined sealing part 124 is formed to be thicker in thickness is that when the sealing pad 120 comes into close contact with the protruding part 154 and the extending part 113 by being pressurized upward, although the first horizontal sealing part 123 and the second horizontal sealing part 125, which are end portions of both sides, relatively come into close contact therewith upward, the inclined sealing part 124 located in the center may come undone. Like this, the inclined sealing part is formed to be thick in thickness so that the inclined sealing part 124 located in the center of the sealing pad 120 can powerfully come into close contact with the connection portion of the protruding part 154 and the extending part 113 without coming undone.

The sealing plate 130 is intended to support the sealing pad 120 from the lower portion, and to enable virtual pressure to be transmitted uniformly when pressure is applied to the sealing pad 120 due to coupling of the sealing nut 140.

The sealing plate 130 is formed of a material having a harder property than that of the sealing pad, such as a metal material and so on, and is formed in a ring-like shape whose center is open. The sealing plate 130 is formed in the ring-like shape to enable the coupling part 153 to pass through the center, and preferably comprises a first horizontal supporting part 133 whose one end 132 is into contact with or comes close to the coupling part 153, an inclined supporting part 134 inclined to face upward from the first horizontal supporting part 133 to the outside, and a second horizontal supporting part 135 horizontally extending from the inclined supporting part 134 to the outside.

That is, the sealing plate 130 comprises the first horizontal supporting part 133, the inclined supporting part 134, and the second horizontal supporting part 135 which support the first horizontal sealing part 123, the inclined sealing part 124, and the second horizontal sealing part 125, respectively.

Unlike the sealing pad 120, thickness of the sealing plate 130 is formed to be identical with each thickness of the first horizontal supporting part 133, the inclined supporting part 134, and the second horizontal supporting part 135. That is, the sealing plate is formed in such a manner as to bend a metal plate two times in the same thickness.

The sealing pad 120 and the sealing plate 130 are configured in such a manner that each of straight line portions 120A and 130A are formed on an inner diameter surface having a round shape. In response to this, the coupling part 153 of the nozzle is also configured in such a manner that a straight line portion (not drawn) is formed on an outer diameter surface. Accordingly, when the sealing pad 120 and the sealing plate 130 are mounted to the coupling part 153, they should be mounted thereto to be suitable to the straight line portions 120A and 130A. In a state of being mounted as described above, when coupling is performed by rotation of the sealing nut 140, thanks to the straight line portions 120A and 130A, the sealing pad 120 and the sealing plate 130 may be prevented from rotating.

The sealing nut 140 is a constituent element in which a screw thread 141 is formed on an inner circumferential surface, thereby being screw-coupled to the coupling part 153 in which the screw thread is formed on an outer circumferential surface.

When the sealing nut 140 moves upward while being coupled to the coupling part 53, it gives pressure to the sealing plate 130 and the sealing pad 120 upward.

Accordingly, as the sealing nut 140 is coupled thereto, the sealing pad 120 is pressed upward, so the sealing pad comes into close contact with the coupling part 153, and the bonding portion of the protruding part 154 of the nozzle 150, and the extending part 113, and thus, sealing is performed so as to enable the fluid to be prevented from flowing out.

In the sealing nut 140 may be formed a through hole 142. Accordingly, when the inside of the liner 110 is filled with the fluid having high pressure, since the fluid flows into the through hole 142, the pressure of the fluid is applied to the sealing plate 130, so sealing is performed in such a manner as to enable the sealing pad to come into close contact with the coupling part 153, and the bonding portion of the protruding part 154 and the extending part 113.

Meanwhile, the first horizontal supporting part 133 protrudes inward beyond the first horizontal supporting part 123 (referring to (A) and (B) shown in FIG. 3 and FIG. 6). In other words, it is preferable that the inner diameter of the sealing pad 120 is greater than that of the sealing plate 130.

Accordingly, if a state represents before the sealing nut 140 puts pressure on the sealing pad as the sealing pad 120 and the sealing plate 130 are mounted to the coupling part 153 from the inside of the liner 110, although one end 132 of the sealing plate will be to come into contact with or come close to the coupling part 153, a minute gap is formed between one end 122 of the sealing pad, and the coupling part 153.

The sealing pad 120 made of the elastic material is compressed accordingly as the sealing nut 140 moves upward by being coupled to the coupling part 153, so the first horizontal sealing part 123 increases in length instead of getting thin in thickness. Like this, a margin of space is given so that the length of the sealing pad 120 can increase. In conclusion, although the gap is formed between the coupling part 153, and one end 122 of the sealing pad 120 before pressure is applied by the sealing nut 140, when the sealing nut 140 puts pressure on the sealing pad 120 by being coupled to the coupling part 153, one end 122 of the sealing pad comes into close contact with the coupling part 153 while the gap is filled, and sealing is carried out with filling in the gap. Accordingly, in a production step of components, although the inner diameter of the sealing pad 120 is formed to be greater than that of the sealing plate 130, with respect to a finished product of the pressure vessel 100 to which even the sealing nut 140 is coupled, since the inner diameter surface of the sealing pad 120 comes into close contact with the coupling part 153, one end 122 of the sealing pad is located on the same vertical line as that of one end 132 of the sealing plate, or is located inward beyond one end 132 of the sealing plate (referring to (C) shown in FIG. 6)

Also, the second horizontal supporting part 135 protrudes outward beyond the second horizontal supporting part 125 (referring to "d1" shown in FIG. 6). That is, it is preferable that the outer diameter of the sealing pad 120 is smaller than that of the sealing plate 130 (referring to (A) and (B) shown in FIG. 6).

When the sealing nut 140 puts pressure on the sealing pad 120, the second horizontal sealing part 125 made of the elastic material also increases in length, so another end 121 of the sealing pad 120 increases in length which is identical with or similar to another end 131 of the sealing plate (referring to (C) shown in FIG. 6).

With respect to the finished product, although the sealing nut 140 puts pressure on the sealing pad 120 by being coupled, it is preferable that another end 121 of the sealing pad doesn't protrude beyond said another 131 of the sealing plate.

If the outer diameters of the sealing pad 120 and the sealing plate 130 are formed to be identical with each other, another end 121 of the sealing pad, and another end 131 of the sealing plate will be located on the same vertical line, and in this state, as the sealing nut 140 puts pressure on the sealing pad, the sealing pad 120 increases in length, so another end 121 of the sealing pad is located outward beyond another end 131 of the sealing plate (referring to (D) shown in FIG. 6).

As described above, when another end 121 of the sealing pad is located outward beyond another end 131 of the sealing plate, another end 121 of the sealing pad fails to be supported from a lower portion, and virtual pressure pressurizing upward also fails to be transmitted. Accordingly, since another end 121 of the sealing pad isn't supported by the sealing plate, sagging may minutely occur, and it is problematic in that the fluid flows out via a space between a portion from which sagging occurs, and the extending part 113.

In conclusion, although the sealing nut 140 puts pressure on the sealing pad 120 by being coupled, in order to form a spatial margin which enables another end 121 of the sealing pad 121 to fail to go outward beyond another end 131 of the sealing plate, it is preferable that the outer diameter of the sealing pad 120 is formed to be smaller than that of the sealing plate 130.

As described above, the pressure vessel 100 according to the present invention has a double sealing structure in which the sealing nut 140 physically puts pressure on the sealing pad 120 made of the elastic material by being coupled to the coupling part 153 so that sealing can be realized, and after the liner 110 is filled with the fluid, the sealing pad 120 is also pressurized by hydraulic pressure via the through hole formed in the sealing nut 140 so that sealing can be realized.

Unlike the aforesaid exemplary embodiment, it is possible to realize another exemplary embodiment in which the pressure vessel 100 according to the present invention is configured in such a manner that the through hole 142 is not formed in the sealing nut.

Also, according to the present invention, it is also possible to realize another exemplary embodiment from which the sealing plate 130 is excluded. With the description in detail, the present invention consists of the sealing pad 120 mounted to the coupling part 153, and the sealing nut 140 which is screw-coupled to the coupling part 153 from the lower portion of the sealing pad 120. In this case, the sealing nut 140 directly applies pressure to the sealing pad 120 made of the elastic material, so sealing is carried out in such a manner as to enable the sealing pad 120 to come into close contact with the extending part 113 and the coupling part 153. Even in this case, when the through hole 142 is formed in the sealing nut 140, the fluid flowing into the through hole 142 directly enables the sealing pad 120 to come into close contact with the extending part 113 and the coupling part 153 using high pressure, so the fluid is prevented from flowing out.

Figure 7:
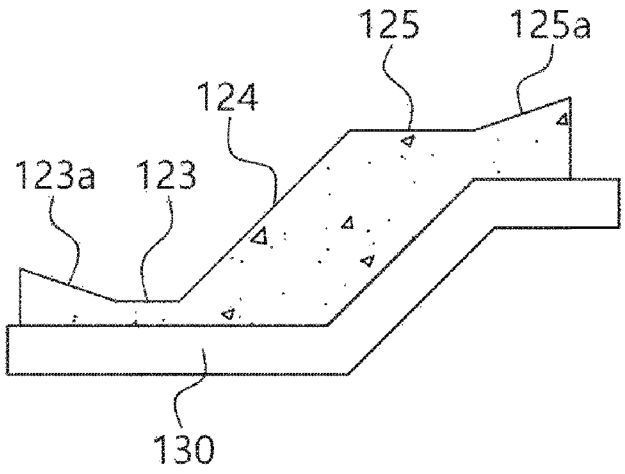
FIG. 7 represents the other exemplary embodiment according to the present invention.

FIG. 7 illustrates the other exemplary embodiment of the present invention. As illustrated, it can be found that the first horizontal sealing part 123 of the sealing pad 120, the end portion of the second horizontal sealing part 125 are formed to be thick. As they are formed as described above, when the sealing nut 140 puts pressure on the sealing pad 120 upward, since the first horizontal sealing part 123 is further compressed compared with that in the exemplary embodiment illustrated in FIG. 6, the sealing pad becomes to come into more close contact with the coupling part 153.

Similarly, when the sealing nut 140 puts pressure on the sealing pad 120 upward, the second horizontal sealing part 125 is further compressed compared with that in the exemplary embodiment illustrated in FIG. 6, so the sealing pad becomes to come into more close contact with the extending part 113.

What is claimed is:

1. A pressure vessel comprising:

a hollow liner capable of being filled with a fluid;

a nozzle combined with one side of the hollow liner;

a coupling part having a cylindrical shape and disposed inside of the hollow liner, the coupling part coupling the hollow liner and the nozzle to each other;

a sealing pad having a ring shape configured to enable the coupling part to pass through its center, formed of an elastic material, and having an inclined sealing part inclined so as to enable a longitudinal section to face downward in a central direction of the nozzle;

a sealing nut coupled to the coupling part from a lower portion of the sealing pad, and a sealing plate having a ring shape furnished between the sealing pad and the sealing nut, configured to enable the coupling part to pass through its center, and formed to be harder than the sealing pad, wherein the sealing plate has an inclined supporting part which is inclined to enable the longitudinal section to face downward in the central direction of the nozzle so as to come into close contact with the inclined sealing part . . .

2. The pressure vessel of claim 1, wherein the sealing pad comprises: a first horizontal sealing part which extends inward from the inclined sealing part, and which is formed horizontally; and a second horizontal sealing part which horizontally extends outward from the inclined sealing part.

3. The pressure vessel of claim 2, wherein thickness of the inclined sealing part is thicker than each thickness of the first horizontal sealing part and the second horizontal sealing part.

4. The pressure vessel of claim 2, wherein the sealing plate comprises: a first horizontal supporting part which extends inward from the inclined supporting part, and which is formed horizontally so as to support the first horizontal sealing part; a second horizontal supporting part which extends outward from the inclined supporting part, and which is formed horizontally so as to support the second horizontal sealing part.

5. The pressure vessel of claim 4, wherein an inner diameter of the sealing pad is greater than that of the sealing plate.

6. The pressure vessel of claim 4, wherein an outer diameter of the sealing pad is smaller than that of the sealing plate.

7. The pressure vessel of claim 2, wherein the nozzle is configured in such a manner that a flange part whose diameter extends is formed in an upper portion of the coupling part, an extending part extending from a side wall of the hollow liner is formed in a lower portion of the flange part, the first horizontal sealing part comes into close contact with the nozzle, and the second horizontal sealing part comes into close contact with a lower porting of the extending part.

8. The pressure vessel of claim 7, wherein a breaking sill intended for strengthening coherence with the nozzle is formed at a tail end of the extending part.

9. The pressure vessel of claim 1, wherein on an upper surface of the sealing nut is formed an inclined surface whose longitudinal section faces downward in the central direction of the nozzle.

10. The pressure vessel of claim 1, wherein the sealing nut has a through hole so that pressure of a fluid preserved in the inside of the hollow liner is transmitted to the sealing pad or the sealing plate.

11. A pressure vessel comprising:

a hollow liner capable of being filled with a fluid;

a nozzle combined with one side of the hollow liner;

a coupling part having a cylindrical shape and disposed inside of the hollow liner, the coupling part coupling the hollow liner and the nozzle to each other; a sealing pad having a ring shape configured to enable the coupling part to pass through its center, formed of an elastic material, and having an inclined sealing part inclined so as to enable a longitudinal section to face downward in a central direction of the nozzle; and a sealing nut coupled to the coupling part from a lower portion of the sealing pad, wherein on an upper surface of the sealing nut is formed an inclined surface whose longitudinal section faces downward in the central direction of the nozzle.

12. A pressure vessel comprising:

a hollow liner capable of being filled with a fluid;

a nozzle combined with one side of the hollow liner;

a coupling part having a cylindrical shape and disposed inside of the hollow liner, the coupling part coupling the hollow liner and the nozzle to each other; a sealing pad having a ring shape configured to enable the coupling part to pass through its center, formed of an elastic material, and having an inclined sealing part inclined so as to enable a longitudinal section to face downward in a central direction of the nozzle; and a sealing nut coupled to the coupling part from a lower portion of the sealing pad, wherein the sealing nut has a through hole so that pressure of a fluid preserved in the inside of the hollow liner is transmitted to the sealing pad or the sealing plate.

* * * * *